3,772,435
METHOD OF USING STEROID ACETONIDES AS GROWTH PROMOTING AGENTS
Robert Daniel Wilbur, Titusville, N.J., assignor to American Cyanamid Company, Stamford, Conn.
No Drawing. Filed Nov. 2, 1971, Ser. No. 195,040
Int. Cl. A61k 17/00
U.S. Cl. 424—241     9 Claims

ABSTRACT OF THE DISCLOSURE

Enchancement of the growth rate of female ruminant animals by parenterally administering to said animals, in a single dose, a growth-enchancing amount of a selected derivative of certain halogenated $16\alpha,17\alpha$-dihydroxy-steroids of the pregnane series.

DESCRIPTION OF THE INVENTION

This invention relates to a method of enchancing the growth rate of female ruminant animals. More particularly, the invention involves parenterally administering to said animals a growth-enchancing composition of a compound having the formula:

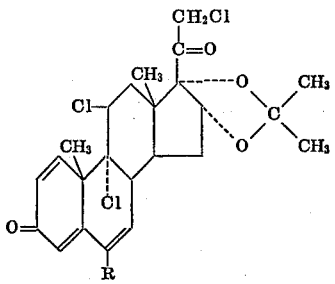

where R is a member selected from the group consisting of hydrogen, chlorine or fluorine and a pharmaceutically acceptable carrier.

The compound $9\alpha,11\beta,21$-trichloro-$16\alpha,17\alpha$-(isopropylidenedioxy)-1,4,6-pregnatriene-3,20-dione (R=hydrogen) and method for its preparation is disclosed in United States Patent No. 3,211,727. According to the patent, the compound is a highly effective anti-inflammatory agent. Recently it has also been found that said compound and derivatives thereof are useful as anti-fertility agents (U.S. Patent 3,608,076) when orally administered to warm-blooded females.

The compounds $6,9\alpha,11\beta,21$-tetrachloro-$16\alpha,17\alpha$-(isopropylidenedioxy)-1,4,6-pregnatriene-3,20-dione and $9\alpha,11\beta,21$-trichloro-6-fluoro - $16\alpha,17\alpha$ - (isopropylidenedioxy)-1,4,6-pregnatriene - 3,20 - dione are disclosed in United States Patent No. 3,541,086.

The patentees indicate that such compounds are also anti-inflammatory agents; however, reference to their use as anti-fertility agents is not made. Surprisingly, it has been found that these compounds and their previously mentioned 6-hydrogen analogue are highly effective growth-promoting agents for ruminant female animals, such as, for example, cattle, sheep and goats, when they are parenterally administered to said animals in a single, 100 mg. to 600 mg., dose. It has been also observed that each of said compounds is effective as an anti-fertility agent.

In accordance with the present invention, the active steroid component can be dissolved or dispersed in a pharmaceutically acceptable carrier for use as an injectable solution or suspension. Among the carriers which may be used are (1) the natural triglycerides, such as glycerol, sesame oil, peanut oil, soybean oil, and the like (2) polyhydric alcohols, such as propylene glycol and polyethylene glycols having an average molecular weight between about 200 and 600, and aqueous solutions thereof, (3) saline suspensions generally containing about 0.9% salt, and (4) saline-polyethylene glycol-carbowax solutions. Generally about 100 mg. to 600 mg. of the active compound is dissolved or dispersed in about 5 ml. to 15 ml. of a pharmaceutically acceptable carrier in solution for use as a single injection. Where desired, pH may be adjusted to 6 to 8 with an appropriate acid or base.

While the preferred route of administration of the growth-promoting compounds is via a liquid injection, the compounds can also be prepared and utilized as implants: for example, solid, paste or as a silastic implant. Examples of formulations that could be used are as follows:

(1)

Liquid:     Preferred formulation
    Steroid (100 mg. to 600 mg.) _____mg__    200
    Polysorbate 80 _____percent__    0.2
    Polyethylene glycol 4000 _____do____    3.0
    Benzyl alcohol _____do____    0.9
    Sodium chloride _____do____    0.9
    Water—q.s. _____do____    100.0

(2)

Solid:
    Steroid (60% to 90%) _____do____    70
    Lubricant (i.e. magnesium stearate) __do____    ½
    Starch—q.s.

or

Steroid (60% to 90%) _____do____    70
    Polyethylene glycol 4000 (3 to 15) __do____    10
    White wax—q.s.

(3)

Paste:
    Drug (100 mg. to 600 mg.) _____mg__    200
    Polyethylene glycol 4000 (30% to 50%)
                                     percent__    40
    Polyethylene glycol 400—q.s.

Moreover, such compounds can also be used as growth-promoting agents in combination with other growth-promoting drugs, such as diethylstilbestrol.

SPECIFIC DISCLOSURE

The invention is further illustrated by the examples set forth below. Parts are by weight unless otherwise indicated.

EXAMPLE 1

In the following test, purebred Hereford heifers, approximately 15 months of age, were used. Each heifer received a full feed (approximately 18 kg.) of corn silage each morning and 2.3 kg. of a high roughage pelleted diet every evening. The diet used contained the following:

| Ingredient: | Percent |
|---|---|
| Ground corn cobs | 40.0 |
| Ground yellow corn | 32.0 |
| Dehydrated alfalfa meal (17%) | 15.0 |
| Soybean oil meal (44%) | 2.5 |
| Cane molasses | 7.0 |
| Urea (45% N) | 1.0 |
| Dicalcium phosphate | 1.5 |
| Trace mineralized salt | 1.0 |
| Total | 100.0 |

Fortified with 909 I.U. Vitamin A and 227 I.U. Vitamin D per kilogram.
Fresh water was supplied ad libitum.

Each heifer selected for use in this test had exhibited three or more normal 18 to 22-day estrus cycles. The quantity of test compound to be injected into each heifer was weighed out into a 10 ml. serum vial. Within an hour before injection, 5 ml. sesame oil was added and the contents were vigorously mixed on a Vortex Jr. mixer for 5 minutes. This mixture was then drawn up into a 10 ml. syringe through a 19 gauge 1.5-inch long needle and injected into the right triceps muscle. The vial was rinsed twice with additional 5 ml. aliquots of sesame oil, which were drawn into the same syringe and injected into the same muscle. Control animals were injected in the same manner with sesame oil only. All compounds were injected at approximately 1:15 p.m. on the scheduled day of injection, which was 7 days prior to the next expected estrus (estimated at 20 days from the last behavioral estrus). Each of six heifers in four groups received 0, 50, 100, or 200 mg. of the test compound $9\alpha,11\beta,21$-trichloro-$16\alpha,17\alpha$ - (isopropylidenedioxy)-1,4,6-pregnatriene-3,20-dione. At the first suspected heat after injection, the heifers were examined by rectal palpation for condition of the uterus. Five to ten days later, they were again rectally palpated for signs of a new corpus luteum, which indicates a recent ovulation.

Determination of heat was made by two daily checks for mounting behavior and rupture of heat mount indicators.

Weights were determined initially and at 20-day intervals, except for the last weighing at 150 days which came after a 30-day interval. Each weighing was based on an average of three weighings on three consecutive days to account for fluctuation in fill.

Individual body weights for the entire experiments are presented in Table I. Table II contains the average daily weight gain (ADG) for each treatment group calculated from day zero for each time interval. Brackets in Table II approximate the mean interval of time during which the heifers in each group showed no estrous activity.

It is obvious from the data of Tables I and II that a 200 mg. injection for the test compound caused a substantial increase in rate of body weight gain throughout the 150 days of this experiment. The 50 mg. and 100 mg. levels appeared to produce some increases in ADG during periods when estrus activity was inhibited; however, at all subsequent intervals, the ADG of the 50 mg. treated group was very similar to controls. At 60 days the ADG showed a significant linear increase (P<0.05) with the 100 mg. and 200 mg. levels of test compound. At 80 and 100 days the increases in ADG were still in proportion to the levels of test compound, but after 130 days on experiment, the over-all ADG from the 100 mg. and 200 mg. levels was significantly greater than controls (P<0.05) and the difference between these levels approached significance at the P=0.05 level. By the end of the experiment (150 days), only the 200 mg. level produced an ADG which was significantly greater than control (approaching P=0.01). Table II also suggests that the beneficial effect from the 100 mg. and 200 mg. levels of test compound on weight gain persited well past the first appearance of estrous behavior in each group.

TABLE I

Body Weights (kg.) [1]

| | Level (mg.) | Heifer number | Post-treatment of— | | | | | | | |
|---|---|---|---|---|---|---|---|---|---|---|
| | | | 0 days | 20 days | 40 days | 60 days | 80 days | 100 days | 130 days | 150 days |
| Treatment: | | | | | | | | | | |
| Control | 0 | 148 | 347 | 358 | 375 | 386 | 387 | 397 | 412 | 421 |
| | | 141 | 410 | 421 | 429 | 441 | 445 | 455 | 474 | 482 |
| | | 164 | 363 | 374 | 388 | 401 | 414 | 418 | 423 | 433 |
| | | 155 | 395 | 409 | 419 | 430 | 435 | 445 | 456 | 471 |
| | | 82 | 355 | 368 | 374 | 389 | 394 | 395 | 412 | 427 |
| | | 108 | 376 | 391 | 397 | 411 | 417 | 419 | 434 | 440 |
| Mean | | | 374 | 386 | 397 | 410 | 415 | 422 | 435 | 446 |
| $9\alpha, 11\beta, 21$-trichloro-$16\alpha, 17\alpha$-(isopropylidenedioxy)-1,4,6-pregnatriene-3, 20-dione | 50 | 166 | 381 | 396 | 410 | 417 | 419 | 424 | | |
| | | 136 | 394 | 404 | 413 | 424 | 426 | 433 | | |
| | | 7 | 349 | 369 | 374 | 386 | 395 | 405 | | |
| | | 93 | 364 | 374 | 378 | 395 | 403 | 409 | | |
| | | 207 | 391 | 409 | 419 | 432 | 445 | 456 | | |
| | | 112 | 360 | 376 | 378 | 383 | 396 | 402 | | |
| Mean | | | 373 | 388 | 395 | 406 | 414 | 421 | | |
| $9\alpha, 11\beta$ 21-trichloro-$16\alpha$- $17\alpha$-(isopropylidenedioxy)-1,4,6-pregnatiene-3, 20-dione | 100 | 101 | 362 | 378 | 386 | 404 | 406 | 415 | 428 | 433 |
| | | 165 | 389 | 405 | 418 | 418 | 433 | 439 | 447 | 460 |
| | | 77 | 333 | 349 | 361 | 364 | 367 | 369 | 378 | 387 |
| | | 150 | 386 | 407 | 422 | 429 | 447 | 450 | 476 | 485 |
| | | 203 | 352 | 368 | 383 | 392 | 404 | 409 | 417 | 431 |
| | | 143 | 428 | 443 | 449 | 464 | 477 | 484 | 503 | [2] 498 |
| Mean | | | 375 | 392 | 403 | 412 | 422 | 428 | 442 | 449 |
| $9\alpha, 11\beta, 21$-trichloro-$16\alpha, 17\alpha$-(isopropylidenedioxy)-1,4,6-pregnatriene-3, 20-dione | 200 | 105 | 393 | 406 | 430 | 437 | 447 | 461 | 487 | 498 |
| | | 208 | 362 | 380 | 392 | 400 | 402 | 406 | 433 | 435 |
| | | 29 | 320 | 336 | 350 | 357 | 369 | 379 | 400 | 415 |
| | | 206 | 362 | 374 | 371 | 396 | 410 | 416 | 436 | 463 |
| | | 204 | 410 | 442 | 449 | 460 | 466 | 475 | 503 | 511 |
| | | 138 | 383 | 418 | 422 | 422 | 430 | 431 | 451 | 465 |
| Mean | | | 372 | 393 | 402 | 412 | 421 | 428 | 452 | 464 |

[1] Mean of three consecutive days to account for fluctuation in fill.
[2] Animal had hoof-rot at time of weighing, at 150 days, which apparently depressed its final weight.

TABLE II

Average Daily Weight Gains (kg.)

| | Level (mg.) | Post-treatment of— | | | | | | |
|---|---|---|---|---|---|---|---|---|
| | | 20 days | 40 days | 60 days | 80 days | 100 days | 130 days | 150 days |
| Treatment: | | | | | | | | |
| Control | 0 | 0.6 | 0.56 | 0.59 | 0.51 | 0.47 | 0.46 | 0.8 |
| Test compound | 50 | [0.73] | 0.55 | 0.55 | 0.51 | 0.48 | | |
| Do | 100 | [0.83] | [0.70] | 0.61 | 0.59 | 0.53 | 0.51 | 0.49 |
| Do | 200 | [1.04] | [0.77] | [0.67] | [0.61] | [0.56] | 0.61 | 0.62 |

NOTES:

Test compound is $9\alpha,11\beta,21$-trichloro-$16\alpha,17\alpha$-(isopropylidenedioxy)-1,4,6-pregnatriene-3,20-dione.

Brackets indicate approximate periods when all six heifers were not cycling.

EXAMPLE 2

Following the procedure of Example 1, beef heifers, approximately 15 months of age, are given injections of 5 ml. of sesame oil containing 100 mg. or 200 mg. of 6,9α,11β,21-tetrachloro-16α,17α - (isopropylidenedioxy)-1,4,6-pregnatriene-3,20-dione or 9α,11β,21 - trichloro - 6-fluoro - 16α,17α - (isopropylidenedioxy) - 1,4,6 - pregnatriene-3,20-dione. The animals are weighed at the start of the treatment and at the intervals indicated in Example 1. Due to the inherent antifertility activity of these drugs, the animals show approximately the same mean interval times during which estrous activity is inhibited as those obtained with equivalent levels of 9α,11β,21-trichloro-16α,17α-(isopropylidenedioxy)-1,4,6 - pregnatriene - 3,20-dione. They also show growth responses for equivalent levels of drug.

What is claimed is:

1. A method for enhancing the growth rate of female ruminant animals comprising parenterally administering to said animals in a pharmaceutically acceptable carrier from about 100 mg. to 600 mg. of a steroid of the formula:

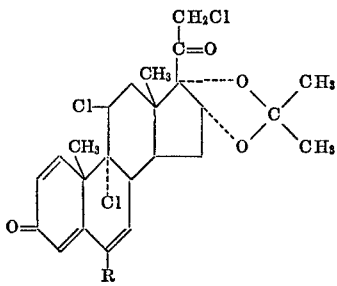

wherein R is a member selected from the group consisting of chlorine and fluorine.

2. A method according to claim 1 wherein the ruminant animals are cattle and the steroid is administered at from 200 mg. to 400 mg.

3. A method according to claim 1 wherein said steroid is administered in a single dose by intramuscular or subcutaneous injection.

4. A method according to claim 3 wherein the steroid is administered at from 200 mg. to 400 mg.

5. A method according to claim 1 wherein the steroid is 6,9α,11β,21-tetrachloro-16α,17α-(isopropylidenedioxy)-1,4,6-pregnatriene-3,20-dione.

6. A method according to claim 1 wherein the compound is 9α,11β,21-trichloro-6-fluoro-16α,17α-(isopropylidenedioxy)-1,4,6-pregnatriene-3,20-dione.

7. A method for increasing the growth rate of female ruminant animals comprising administering a subcutaneous implant in a form selected from the group consisting of solid implants, paste implants and silastic implants having as the active component a steroid of the formula:

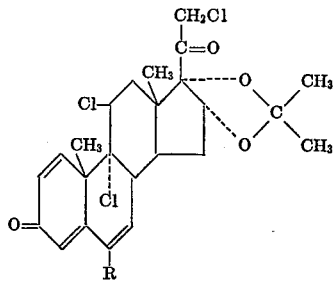

wherein R is a member selected from the group consisting of chlorine and fluorine.

8. A method according to claim 7 wherein the steroid is 6,9α,11β,21-tetrachloro-16α,17α-(isopropylidenedioxy)-1,4,6-pregnatriene-3,20-dione.

9. A method according to claim 7 wherein the steroid is 9α,11β,21 - trichloro-6-fluoro-16α,17α-(isopropylidenedioxy)-1,4,6-pregnatriene-3,20-dione.

References Cited
UNITED STATES PATENTS

| | | | |
|---|---|---|---|
| 3,608,076 | 9/1971 | Heller | 424—241 |
| 3,541,086 | 11/1970 | Fried | 260—234.55 |
| 3,211,727 | 10/1965 | Heller et al. | 260—239.55 |
| 3,651,227 | 3/1972 | Sickles | 424—238 |
| 3,036,917 | 5/1962 | Harrop | 424—240 |
| 3,417,182 | 12/1968 | Babcock et al. | 424—243 |
| 3,639,585 | 2/1972 | Hosse | 424—240 X |
| 3,499,445 | 3/1970 | Reed | 128—260 |
| 3,565,991 | 2/1971 | Short | 424—243 |

SHEP K. ROSE, Primary Examiner